April 3, 1945.  J. H. OSWALD  2,372,792
PANEL STRUCTURE AND ELEMENTS THEREOF
Filed Nov. 19, 1942  4 Sheets-Sheet 2

INVENTOR
Joseph H. Oswald
BY Ray A. Gehr
ATTORNEY

INVENTOR
Joseph H. Oswald
BY Ray A. Gehr
ATTORNEY

Patented Apr. 3, 1945

2,372,792

UNITED STATES PATENT OFFICE 2,372,792

PANEL STRUCTURE AND ELEMENTS THEREOF

Joseph H. Oswald, South Euclid, Ohio, assignor to W. J. Dennis & Company, Chicago, Ill., a corporation of Illinois Application November 19, 1942, Serial No. 466,169

18 Claims. (Cl. 160—210)

The invention relates to improved panel structures applicable for various uses in the building construction field including windows and particularly storm and screen windows, doors, partition walls, porch enclosures, and joint structures therefor, and also to metal elements and combinations thereof suitable for the fabrication of such panel structures and especially composite panel structures formed largely of wood.

It is an object of the invention to provide a panel structure comprising a panel formed chiefly of wood but having novel edge elements of metal serving to (a) lend strength to the wood structure and thus make feasible use of wood members of smaller cross-section, (b) facilitate pivotal movement of one panel structure in relation to another adjacent panel or other structure about an axis parallel to the edges of the panel and (c) form, with an adjacent similarly edged part, a joint that is to a high degree weather tight.

Another object of the invention is to provide a panel structure of the character above noted in which the metal edge elements are formed with complementary tongues and grooves extending longitudinally of the elements, the tongue on one element and the groove therefor on the other in their interlocking engagement serving to keep the joint closed during a considerable amount of the stated pivotal movement of a panel.

A further object of the invention is to provide a panel structure of the character above indicated in which each of the complementary metal edge elements has a pair of parallel tongue and/or groove formations and which affords guidance for pivotal movements of the panel in opposite directions about separate axes parallel to the edge of the panel.

Still another object of the invention is to provide a joint structure comprising a pair of complementary metal channel members disposed back to back and adapted to serve as edge boundaries of adjacent panel or other structures of wood, each of the channel members being formed adjacent each of its flanges with a tongue or groove in such a manner that a tongue of one channel can fit into an oppositely disposed groove of the other channel and that the channels can have pivotal movements in relation to each other about either of two axes extending parallel to the channels, with the movement about one axis opposite to that about the other axis.

Another object of the invention is to provide a metal channel member having a tongue extending lengthwise of the channel adjacent one flange thereof and a groove extending lengthwise of the channel adjacent the other flange thereof with the tongue and groove so formed that when two sections of the channel are opposed to each other the tongue of each section will fit into the groove of the other and the two channel sections can move pivotally about either of two axes parallel to the channels with the movement about one axis opposite in direction to the movement about the other axis.

Still another object of the invention is to provide a pair of complementary metal channel members adapted to serve as edge boundaries of adjacent panel structures, or other structures, of wood, one of the members being formed with a groove extending lengthwise thereof and the other with a tongue extending lengthwise thereof and adapted to fit into the groove of the other member and the said tongue and groove being formed to permit pivotal movement of the two channel members about an axis extending parallel to the said members and meanwhile to maintain interlocking engagement between the tongue and groove parts of the members and obviate mutual displacement of the two members from their pivotal relations to each other as well as maintain good appearance and weather repellent qualities.

A further object of the invention is to provide an improved multiple-panel storm window of the type adapted to be converted readily into a screen window and utilizing the novel channel members above referred to.

Another object of the invention is to provide an improved single-panel screen window that can be used alone or easily converted for use in combination with a storm window panel.

Another object of the invention is to provide a storm or screen window panel of the pivotally mounted type with improved securing and locking means.

The invention has various other objects some of which are more or less incidental or ancillary to those above noted and all of which will be apparent in the description which follows.

With the various noted objects in view, said invention consists in various forms, constructions, arrangements and combinations of parts hereinafter described in connection with the accompanying drawings and particularly pointed out in the appended claims.

Referring in detail to the structures illustrated in the drawings, and first to the combined storm and screen windows shown in Figs. 1 to 9, the numeral 1 indicates as an entirety a building wall structure of conventional frame type. 2 designates as an entirety a window frame in which is mounted a double-hung window comprising an upper sash 3 and lower sash 4. The window frame comprises stiles 5, 5, a head 6 and a sill 7 together with inside window stops 8, intermediate stop 9 and upright and transverse outside stops 10 and 11, respectively. The frame is provided with outside trim members 12 and 13 and the entire construction thus far described is of the conventional sort.

The storm and screen window structure made in accordance with the present invention comprises an upper panel or sash 14 and a lower panel or sash 15. The upper panel frame comprises side members 16, 16, top rail 17 and a bottom or meeting rail 18, all of which are entirely of wood except the meeting rail 18 which is formed partly of wood and partly of metal.

The lower panel 15 has a frame structure comprising side members 19, a top meeting rail 20 and a bottom rail 21. The frame members of the lower panel or sash are formed of wood except the top or meeting rail 20 which, like the rail 18, is formed partly of wood and partly of metal. The panels or sash structures 14 and 15 are provided with glazing of conventional type which need not be described.

The upper panel 14 is supported as shown within the frame formed by the outside trim members 12 and 13 and against the outside stop members 10 and 11, and with freedom to swing outward at its lower end. Any suitable means for so supporting panel 14 may be employed, such for example as the conventional hook and eye hangers commonly employed in connection with single or unitary frame storm windows. However, I prefer to so support the upper sash by means of two coiled springs 22, 22, the lower ends of which are attached to screw eyes 23 carried by the panel uprights 16, 16 and the upper ends of which are attached to screw hooks 24, 24 carried by the transverse stop member 11.

The lower panel 15 is supported from the upper panel by means of two coiled springs 25, 25, the lower ends of which are secured to screw eyes 26 carried by the side members 19 of panel 15 and the upper ends of which are detachably secured to hooks 27 carried by the side members 16 of the upper panel. The springs 25 yieldingly hold the top rail 20 of the lower sash in contact with the bottom rail 18 of the upper sash.

The meeting rails of the upper and lower panels of the storm window are of novel construction which will now be described. Referring to the meeting rail 18 of the upper sash, it will be noted from Fig. 7 that said rail comprises a wood core or body 28 and a metal channel member 29 which is preferably rolled from suitable sheet metal. The channel comprises a web section 29$^a$ and outside and inside flanges 29$^b$, 29$^c$, respectively, and it is formed so that its overall transverse dimension equals the thickness of the upright frame member 16 of the panel or sash, the wood section 28 of the meeting rail being reduced in thickness to fit within the flanges of the channel. The web 29$^a$ of the channel is formed on its outside adjacent the flange 29$^b$ thereof with a groove 29ᵈ and, adjacent the flange 29ᶜ thereof, with a tongue 29ᵉ.

Figures 3, 4, 5, 6, 7, 8, 9, 10, 11, 12:
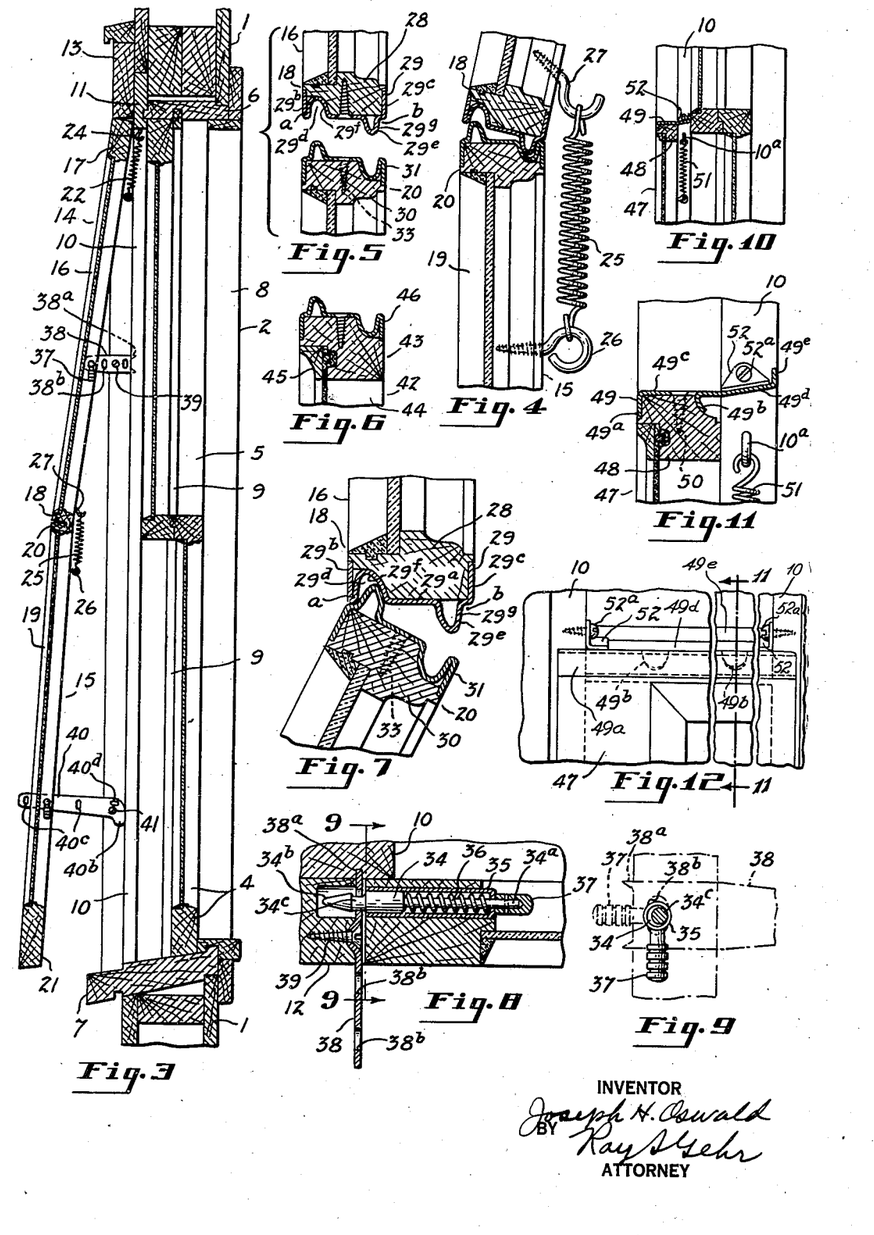
Fig. 3 is a sectional view taken on the same vertical plane as Fig. 2 but showing an adjustment of the storm window which will permit washing from the inside of the building of the outer side of the double-hung main window.
Fig. 4 is an enlarged fragmentary sectional view showing the joint structure of the window as illustrated in Fig. 3.
Fig. 5 is an enlarged fragmentary view of the adjacent joint portions of the storm window with the panel parts slightly separated to better show the forms of the metallic channel members thereof.
Fig. 6 is a fragmentary sectional view of the upper portion of a screen window panel adapted to be substituted for the lower panel of the storm window illustrated in Figs. 1, 2 and 3.
Fig. 7 is a transverse sectional view on a still larger scale of the improved channel members and illustrating the interlocking character of the channels.
Fig. 8 is an enlarged fragmentary section on the line 8—8 of Fig. 1 showing one of the locking bolts of the window.
Fig. 9 is a sectional view on the line 9—9 of Fig. 8 showing the locking bolt, with the positions of some of the associated parts of the structure shown in broken lines.
Fig. 10 is a fragmentary vertical section on a reduced scale showing the upper part of a screen window panel with the cooperating parts of a window frame and main window of the double-hung type.
Fig. 11 is a view generally similar to Fig. 10 but on a larger scale.
Fig. 12 is a fragmentary front elevation of the window structure illustrated in Fig. 10.

The groove 29ᵈ and the tongue 29ᵉ are so formed that, if the channel were divided lengthwise into two parts of equal width and the tongue half turned about its severed edge to bring its flange 29ᶜ into alignment with the flange 29ᵇ, the tongue 29ᵉ would fit into the groove 29ᵈ, preferably with a small clearance. With the channel thus constructed it will be apparent that two strips or sections of the channel are adapted to fit together in complementary fashion with the tongue and groove of one channel interlocking with the groove and tongue of the other channel.

Accordingly the top rail 20 of the lower panel 15 has a wood core part 30 and a metal channel 31 that are identical in form with the wood and metal parts 28 and 29 of the meeting rail 18 of the top panel of the storm window and the above description of the bottom rail will serve also for the top rail.

The channels 29 and 31, as has been noted, are formed to have their flanges embrace the wood body or core parts 28 and 30 of the meeting rails and the channels are additionally secured to their respective wood cores by means of relatively long screws 32, 32 which extend through the webs of the channels at the ends thereof and into the side members 16, 16 of the upper panel and 19, 19 of the lower panel, respectively. In addition, a number of short screws 33, 33 serve to secure the channels to the wood cores at points intermediate the ends thereof. The flat middle portions of the channel webs afford suitable space for such securing screws. The composite meeting rails thus formed and constructed, although quite slender, are exceedingly strong.

It will be seen that the double tongue and groove construction of the channel members of the meeting rails of the window afford a relatively weather-tight joint between the top and bottom panel structures. In addition, the channels are so formed as to permit and facilitate relative pivotal movements of the channels. To this end the tongues and grooves of the channel members are preferably formed in a manner which will now be described.

From an inspection of Fig. 7 it will be observed that the outer side or flank of the tongue of the channel joins the web thereof on a line adjacent a flange of the channel in a manner to form a rounded shoulder that serves as a pivotal seat for that portion of the complementary channel constituting the junction between the outer side of the groove of the other channel and the adjacent flange thereof. In order that the panels may have freedom for relative pivotal movement about an axis at $a$ or $b$ (Fig. 7) extending parallel to the said shoulder or seat, the inner side 29ᶠ of the groove 29ᵈ is preferably formed with a surface that is cylindrical with respect to the said axis and the inner flank of the rib 29ᵉ is preferably, though not necessarily, given a corresponding cylindrical form. Thus when the lower panel, for example, is swung outward, around the axis $a$, in relation to the upper panel (Fig. 7) the inside flank of the tongue is maintained in relatively close engagement with the cylindrical surface 29ᶠ throughout a relatively wide range of angular movement, and meanwhile the root of the outside flank of the tongue is maintained by the tension of the springs 25 in pivotal contact with the pivotal part of the opposing channel.

An effective interlocking pivotal connection is thus afforded which permits smooth pivotal movement of one sash in relation to the other and at the same time maintains the channel parts in firm interlocking engagement to resist relative lateral displacement of the channels and also provides a practically weather-tight joint. When the lower panel 15 swings outward relative to the upper panel 14 it will be apparent that the outer side of the groove in the channel 31 of the lower panel must clear the adjacent outer flank of the rib 29ᵉ of the upper channel 29. Accordingly said outer flank 29ᵍ is given a form that is cylindrical with respect to the axis $a$. Preferably, though not necessarily, the outer side of the groove of the lower (and the upper) channel is given a similar cylindrical form for by making the outer side of the groove conform to the outer flank of the rib, and by similarly making the inner flank of the rib corresponding to the cylindrical inner side 29ᶠ of the groove as previously noted, a closer fitting of the two channels is effected throughout their adjacent surfaces when the two panels are in alignment and better resistance to the weather is thus provided. The joint formed by the interlocking tongue and groove formation naturally affords greater resistance to the weather than can be secured between two plane surfaces and of course the double tongue and groove construction affords a double weather seal when the planes of the two panels are in alignment.

Figure 2:
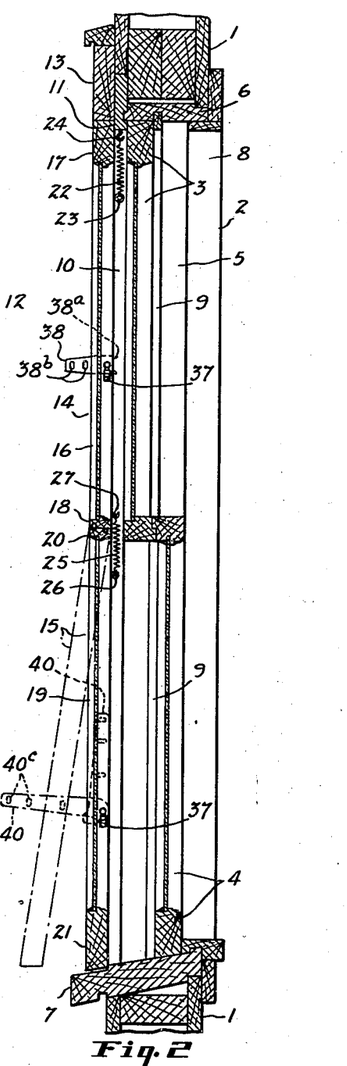
Fig. 2 is a sectional view of the storm window taken on the line 2—2 of Fig. 1, adjustment of the lower panel of the storm window, for ventilation, being indicated by broken lines.

In Fig. 7 the lower panel is shown swung outward in relation to the upper panel around the axis $a$, as indicated by the dot-and-dash lines in Fig. 2. In Fig. 3, on the other hand, the lower panel is shown swung slightly inward in relation to the upper panel, the swinging movement being effected around the axis indicated at $b$ in Fig. 7. The action of the complementary tongue and groove parts adjacent the axis of rotation is precisely the same in each case, whether the pivotal movement be about the axis $a$ or about the axis $b$, and the springs 25 serve in both cases to maintain the pivotal parts in mutual engagement.

Each of the two panels 14 and 15 is provided with suitable locking or securing means of the sliding bolt type, each panel having such a locking bolt mounted in each of its two upright sash members. Referring to the construction of one of the upper panel locking means, as shown in Figs. 8 and 9, 34 is a bolt member slidably mounted in a tubular case 35 which is pressed into a hole in the upright sash member. The bolt has a section 34ᵃ of reduced diameter throughout the major part of its length to accommodate a coil spring 36 which at one end engages a shoulder of the bolt 34 and at its other end engages the inturned end of the case 35 so as normally to press the bolt outward as far as is permitted by the operating handle 37 which is secured by a pin on the reduced end of the bolt. The part of the bolt 34 which projects from the open end of case 35 comprises a tapered end 34ᵇ and, intermediate said end and the main body of the bolt, is an eccentric neck portion 34ᶜ.

The securing means further includes a keeper 38 in the form of a straight metal strip which is secured by prong ends 38ᵃ and a securing screw 39 to the frame structure. The keeper 38 is formed with a series of holes 38ᵇ to receive the projecting end of bolt 34.

In the operation of the securing device the tapered end 34ᵇ facilitates entrance of the bolt into the keeper holes 38$^b$, under the urging of spring 36, and by the wedge action of the tapered end supplements the springs 22 in supporting the weight of sashes 14 and 15. When the bolt has fully entered the innermost keeper hole 38$^b$, it can be rotated by turning the handle 37 downward from a horizontal position to the full line position shown in Fig. 9 so that the eccentric neck 34$^c$ of the bolt forces the window panel inward against the window stops 10 and 11 to effect a weather-tight closure.

The securing or locking devices of the lower panel 15 are like those of the upper panel (as above described) insofar as the bolt mechanism is concerned but differ somewhat as to the apertured keeper elements. As is shown in Figs. 2 and 3, the keeper elements 40 are longer than the elements 38 of the upper panel locks and each is pivotally secured to the window frame structure by a pivot screw 41. The keeper strip 40 is formed so that it can swing from the upright position shown by dotted lines in Fig. 2 to an approximately horizontal position shown by dotted lines in Fig. 2 and by full lines in Fig. 3. The keeper is prevented from swinging below the horizontal position by means of a toe 40$^b$ which engages the stop 10. The keeper strip 40 is formed with a series of apertures 40$^c$ adapted to be engaged by the locking bolt to hold the lower sash in any one of several open positions and by an aperture 40$^d$ which is so disposed in relation to the pivotal screw 41 that the locking bolt serves when in engagement with aperture 40$^d$ to hold the keeper 40 in upright position and the lower panel locked in its closed position. The tapered ends of the lower sash cooperate with the keeper holes of the part 40 in the manner noted in connection with the bolts of the sash 14.

As shown in Figs. 1 to 5, inclusive, both of the panels 14 and 15 are glazed so that the structure functions as a storm window. Such a storm window, by virtue of its double panel construction and fittings, can readily be converted into a screen window of highly advantageous character. This is accomplished by providing a screen sash 42 (Fig. 6) which is identical with the sash 15 of the storm window except that it is provided with wire screen in lieu of the glass of the panel 15 and that the meeting rail 43 joining the upright members 44 of the sash 42 must be made somewhat deeper vertically than the top meeting rail of the glazed storm sash 15, to permit a suitable fastening of the wire screen by means of molding strip 45. As will be noted from Fig. 6, the top rail of the screen panel is fitted with a metal channel member 46 identical in form with the channel member 31 of the glazed panel 15.

In the use of the double panel storm and screen window described above the procedure of mounting or attaching the window is as follows: the lock keeper members 38 and 40 having been attached to the frame structure and screw hooks 24 having been attached to the upper stop member 11 at either side of the window openings, the upper panel 14, with the lower panel detached therefrom, is first secured in position. This may readily be accomplished from the interior of the building by lowering the upper sash of the double-hung window and extending the panel 14 through the opening provided. The person installing the window then grasps the two coiled springs 22, 22 and supporting the panel by the springs lifts it into position to pass the top eyes of the springs over the hooks 24. To accomplish this easily the panel 14 is raised until its top rail 17 is outside of and overlapping the transverse trim board 13. In this manner it is possible to attach the springs without placing them under tension.

Figure 1:
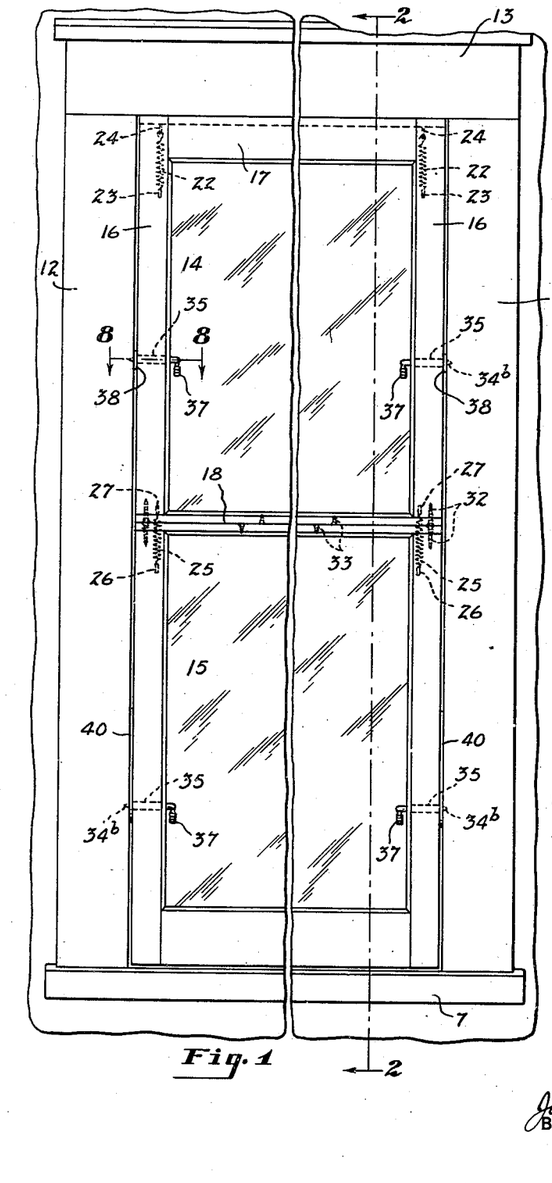
Fig. 1 is an outside elevation of a two-panel storm window and associated building structure presenting one of the embodiments of the invention, a vertical, intermediate portion of the entire structure being broken away.

With the springs attached, the sides of the panel 14 may be grasped to pull the panel down into the position shown in Figs. 1 and 2.

Next, the upper sash of the double-hung window is raised to closed position and the lower sash thereof raised to fully open position whereupon the lower panel 15 of the storm window may be attached to the upper panel by a procedure similar to that described in mounting the upper panel 14. With the two panels thus suspended from the top hooks 24, 24 the handles 37 of the locking bolts of the top panel may be grasped to pull said panel into closed position and to there secure it. To effect closure and locking of the bottom panel the keepers 40 are first swung to vertical position, and the bolt handles are then grasped to pull the bottom panel into fully closed position and to there lock it by effecting engagement of the bolts with the keeper apertures 40$^d$, the bolt handles being turned to effect firm closure as previously explained.

In the normal use of the storm window, the lower panel thereof may at any time be secured in either of several open positions, as indicated by broken lines in Fig. 2. When the bottom panel is thus opened it swings about the axis $a$ (Fig. 7), as previously explained.

The improved storm window makes it possible to wash both sides of the double-hung window and of the storm window from the interior of the building since it is comparatively easy to dismount the storm window panels one at a time from the interior of the building so that they can readily be washed and then, after washing the outsides of the double-hung sash the storm window can be remounted in the manner described above.

If it is preferred not to dismount the storm window to effect washing, the outer sides of the double-hung sash and the insides of the storm window may readily be washed from the inside by adjusting the storm sash panels to positions such as indicated in Fig. 3, the outer sides of the storm panels being washed from the outside.

With the improved construction, upon the advent of warm weather the lower storm panel 15 is dismounted and the screen panel 42 is mounted in lieu thereof. This provides an advantageous form of screen window since the lower, screen panel thereof may be unlocked and swung outward at the bottom to permit the brushing out of dust that may accumulate on the window sill. Also, the construction has the great advantage that during rainy weather the double-hung window can be adjusted so as to prevent entrance of rain while maintaining sufficient opening for ventilation. To accomplish this the upper sash of the double-hung window is fully lowered and the lower sash of said window is raised as much as may be desired, whereupon air may pass through the screen panel and upward between the double-hung window and the top panel of the storm and screen window to enter the room over the tops of the double-hung sashes.

In Figs. 10, 11 and 12 is shown a single panel window screen of special construction adapting it to be used either alone as a single panel screen or as a screen panel in combination with a top glazed panel as in the case of the combined storm and screen window described above. In the single panel construction shown in Figs. 10 to 12 the screen panel designated as an entirety by the numeral 47 is identical with that shown in Fig. 6 except that the top rail 48 thereof comprises a metal strip fitting 49 differing from the channel 46 of the screen panel 42. The top strip 49 at its outer side is formed with a depending flange 49$^a$ to engage the outer side of the wood cross rail 48 and is formed with a series of depending ears or lugs 49$^b$ which are stamped from the web 49$^c$ and bent downward to engage the inner side of the wood rail 48. The metal member 49 is also extended inward at 49$^d$ and thence upward to form an upstanding flange 49$^e$. The web 49$^d$ is of a width to make the upstanding flange 49$^e$ reach the outer side of the lower meeting rail of the upper window as shown in Fig. 10 and the portions 49$^d$ and 49$^e$ extend across the window opening between the upright stop members 10, 10 of the window to serve as a fly or insect stop. The metal strip 49 is secured to the wood rail 48 by means of screws as in the case of the channel 31 of the previously described bottom panel 15 of the storm window, one such screw being shown at 50. The panel is fitted with two coil springs 51, 51 which detachably engage a screw eye 10$^a$ secured to stop 10. To the inner sides of the stop members 10 are attached fastening angles or keepers 52, 52 each of which is pivotally secured to one of the upright window stop members 10, 10 by a screw 52$^a$.

In mounting the window screen the outer ends of the angles 52 are turned upward somewhat so that the portion 49$^d$ and flange 49$^e$ of the screen fitting 49 can be engaged with the angles 52 while the bottom of the screen is inclined outward, and then the bottom of the screen is swung inward to bring the screen into closed position as indicated in Figs. 10 and 11 and springs 51 are attached to screw eyes 10$^a$. It not infrequently happens that buildings are fitted with storm windows some time after they have been screened. By using a screen of the type just described it is possible to convert the same for use in connection with a two-panel storm window of the type shown in Figs. 1 to 5. All that is required is the removal of the metal fitting 49 of the screen panel 47 and the substitution therefor of a channel fitting such as is shown at 46 in Fig. 6.

Figure 13:
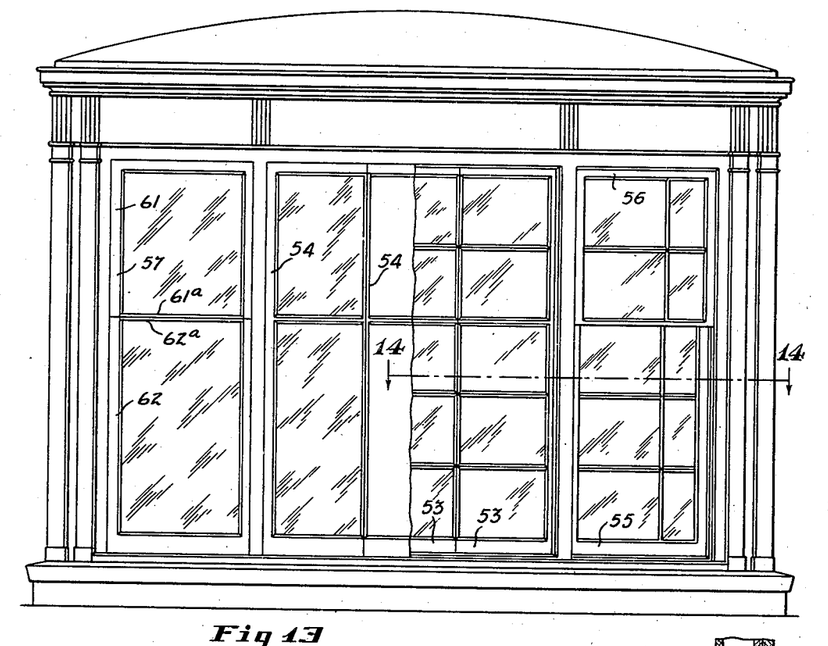
Fig. 13 is a front elevation of a bay window structure fitted with storm windows embodying features of the present invention.
Figures 14, 15, 16:
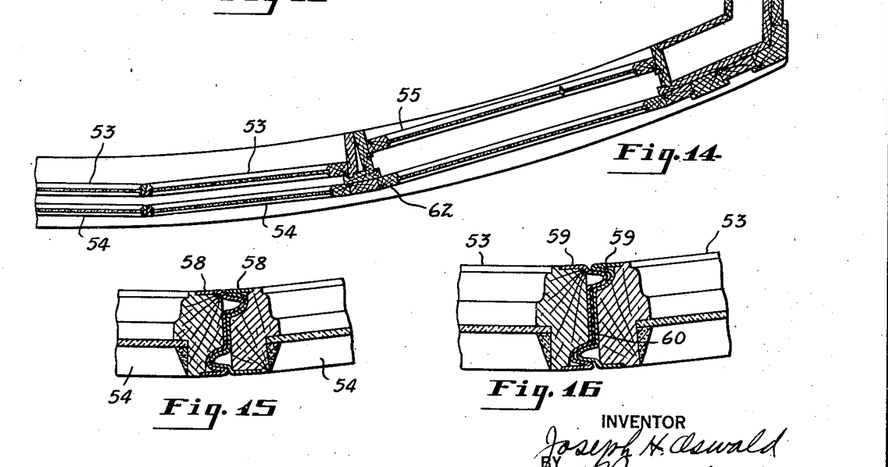
Fig. 14 is a horizontal section on the line 14—14 of Fig. 13.
Fig. 15 is an enlarged fragmentary section of one of the vertical joints of the storm window shown in Figs. 13 and 14.
Fig. 16 is a view similar to Fig. 15 showing the vertical joint structure of the central main window sashes shown in Figs. 13 and 14.

In Figs. 13 to 16 is shown a bay window structure including storm windows and embodying the improved metal channel elements of the character shown in Figs. 1 to 6, inclusive. The bay window structure is framed with three window openings, the central opening being closed by three fixed inner window panels 53, 53, and three storm window panels 54, 54, two of each of which are shown in Figs. 13 and 14. Each of the side openings of the frame structure is closed by movable double-hung window sashes 55 and 56 and by a double (top and bottom) panel storm window designated as an entirety by 57, as shown in Figs. 13 and 14. Fig. 15 is an enlarged (full size) fragmentary section through the vertical joint between the two storm sashes 54, 54 shown in Fig. 14 and Fig. 16 is a similar view of the adjacent vertical joint between the main window sashes 53, 53, shown in Fig. 14. The joints of the storm sashes 54 are formed by metal channels 58, 58 of the same character as the channels 29 and 31 shown in Fig. 7. However, to provide for the curvature of the bay window structure the upright wood members of the sashes 54, 54 are formed to receive the metal channels at an angle to the planes of the sashes so that complete engagement of the double tongue and groove channels may be maintained.

In Fig. 16 the inner sashes 53, 53 are provided with metal channels 59, 59 similar in form to those of Fig. 15 and, since the inner sashes are set permanently the channel joints are united with plastic caulking material at 60. Each of the storm windows 57 comprises an upper panel 61 and a lower panel 62, the meeting rails 61$^a$ and 62$^a$ of which are provided with channel joints of identically the same character as the joints shown in Figs. 1 to 5, inclusive. It will be understood that the panels 61 and 62 may be provided with supporting and locking fittings of the character shown in Figs. 1 to 3.

Figure 17:
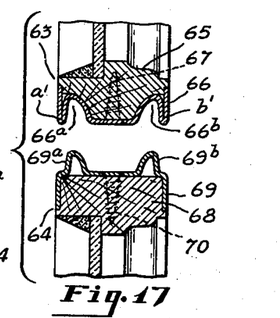
Fig. 17 is a view similar to Fig. 5 showing modified forms of interlocking channel members.

While the form of metal channel members shown in Figs. 1 to 6, inclusive, and Figs. 13 to 16, inclusive, is such as is preferred in the carrying out of the invention, other channel forms may be employed to secure at least some of the advantages of the invention. In Fig. 17 one other such form is illustrated. This view is similar to Fig. 5 and represents the meeting rails 63 and 64 of the upper and lower panels of a storm window such as is illustrated in Figs. 1 to 3. In this modified construction the upper rail 63 comprises a wood core member 65 and a channel member 66 secured to the core by screws 67. The channel member 66 is formed adjacent its flanges with grooves 66$^a$, 66$^b$. Similarly the bottom meeting rail 64 comprises a wood core 68 and a metal channel member 69 which is formed with a pair of tongues 69$^a$, 69$^b$, the channel member being suitably secured to the core by screws 70.

It will be apparent that the double tongue and groove construction shown in Fig. 17 can function to effect a weather seal and permit pivotal movement of one panel in relation to the other about the two parallel axes at $a'$ and $b'$ in substantially the same manner as in the case of the construction shown in Figs. 5 and 7, the inner and outer sides of the grooves 66$^a$ and 66$^b$ being given cylindrical forms of short and long radii, respectively, and the complementary surfaces of the tongues 69$^a$ and 69$^b$ being preferably shaped to conform to the sides of the grooves.

Figure 18:
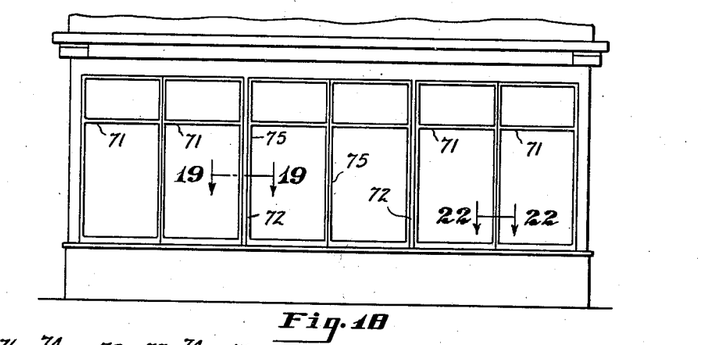
Fig. 18 is a front elevation of a glass or screen porch enclosure embodying the improved panel construction.
Figure 19:
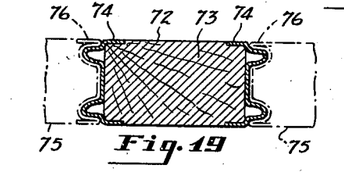
Fig. 19 is an enlarged horizontal section on the line 19—19 of Fig. 18.
Figure 22:
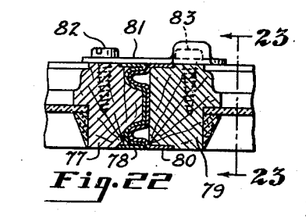
Fig. 22 is an enlarged section on the line 22—22 of Fig. 18.

In the porch or sunroom enclosure shown in Fig. 18 the framed openings are closed by a series of wood frame panels 71, 71 and the framework of the panel openings comprises upright posts 72, 72 which are positioned in relation to the uprights of the framing so that each of the panels 71 engages an upright frame part on one vertical edge and an adjacent panel on its other vertical edge. Each panel may thus be supported along three of its four sides or edges by suitable stops or ledges of the porch framework in well known manner. Each of the posts 72 comprises a core 73 of wood and a pair of metal channels 74, 74. These channels 74 may be similar in form to those shown in Figs. 1 to 5, inclusive, but as illustrating the possible use of different channel forms channels 74 are shown similar to the channels 69 of Fig. 17, each channel being formed with a pair of outwardly-extending tongues. Correspondingly the upright members 75 of the panels 71 which join the posts 72 are fitted with double-groove metal channels 76 formed to fit the tongues of channels 74. The upright members of panels 71 which are in mutual engagement are provided with tongue and groove channel members as shown in section in Fig. 22 where one of the wood cores 77 is provided with a double-groove channel 78 while the other wood core 79 is provided with a double-tongue channel 80. These upright members of the panel are also fitted on their inner sides with a locking hook 81 which is secured by pivot screw 82 to one upright member and engages a keeper screw 83 on the other upright. It will be understood that all of the channel members attached to the wood cores 73 of the posts 72 and to the cores 75, 77 and 79 of the panels are suitably secured to the core parts by screws (not shown).

It will be seen that the upright posts 72, 72 consisting of the wood core 73 and the metal channels 74 constitute an exceedingly strong form of construction. In fact, where extremely slender uprights are desirable for architectural effects such uprights can be produced with quite adequate strength by reducing the width of the wood core as indicated in Figs. 20 and 21.

Figures 20, 21, 23, 24:
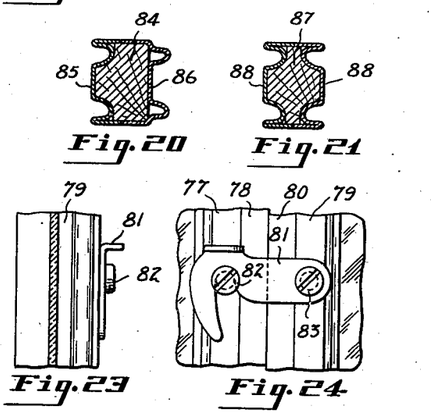
Figs. 20 and 21 show modified forms of the construction shown in Figs. 18 and 19.
Fig. 23 is a fragmentary vertical section on the line 23—23 of Fig. 22.
Fig. 24 is a fragmentary inside elevation of the fastening structure shown in Figs. 22 and 23.

In Fig. 20 the wood core 84 is reduced to minimum width so as to be completely enclosed by channels 85, 86, the former of which is formed with two grooves and the latter with two tongues.

In Fig. 21 also the wood core 87 is of minimum width and enclosed by channels 88, 88, each of which is formed with a pair of grooves.

Figure 25:
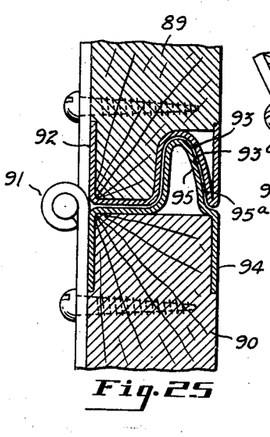
Fig. 25 is a fragmentary sectional view of a hinged joint structure suitable for garage doors of the lift type and other pivotal jointed structures.
Figure 26:
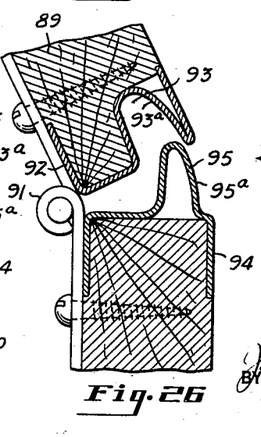
Fig. 26 is a view similar to Fig. 25 with the hinged joint flexed.

Figs. 25 and 26 illustrate the joint portion of a multiple-panel horizontal joint door structure of the lift or overhead type suitable for garages and other comparable buildings. In this construction upper and lower wood panels 89 and 90 are connected on the inner side of the door by means of hinges 91 of conventional type. The lower edge of the panel 89 is fitted with a metal channel member 92 formed with a groove 93 while the lower panel 90 is fitted with a metal channel 94 formed with a tongue 95 to fit the groove 93. The outer side 93ª of the groove 93 and the outer flank 95ª of the tongue 95 are given parallel cylindrical forms with respect to the axis of the hinges 91 so that when the hinged joint is opened, in the opening or lifting of the door, as shown in Fig. 26, the flank of the tongue and the adjacent side of the groove are maintained in close proximity throughout a relatively wide angular movement so that in the opening of the door the joint is not opened or exposed. Consequently good protection against the weather is provided, and also during the closing of the door there is no possibility of an open joint pinching and seriously injuring the fingers of the person manipulating the door, as may accidentally occur with resultant serious injury in the conventional open joint.

The metal channel door joint has the obvious additional advantages of strength and effective sealing of the door joints against the weather.

It is believed that the numerous advantages of the improved panel, joint and channel structures which have been described will be apparent. The functional advantages of the combined storm and screen windows have been explained and it remains only to point out that by reason of the great strength of the composite wood and metal sash or panel frame construction the members of the sash such as the meeting rails of the storm window shown in Figs. 1 to 5 can be made remarkably slender and no greater in width than the meeting rails of the standard double-hung window, thus preserving the architectural lines desired by the architect. Similarly upright sash and frame members can be given desirable slender forms as indicated in Figs. 13 to 16, inclusive, and Figs. 18 to 24, inclusive.

The preferred form of metal channel member shown in Figs. 1 to 16, inclusive, has the marked advantage that a single channel form when cut into separate strips may be combined in complementary pairs to provide the improved interlocking joints. This effects a marked savings as compared with the dissimilar metal channels shown in Figs. 18 to 24 since with the single combined groove and tongue channel form the cost of the tools and equipment for the manufacture of the channel and of the wood cores which must be formed to fit the channel is roughly only half that involved in the production of the dissimilar metal channels and corresponding wood cores.

It should be understood that the foregoing description is illustrative and explanatory and that the structures shown and described can be modified in various ways without departing from the invention as defined in the appended claims.

What is claimed is:

1. A structure comprising in combination: a panel element having a straight edge portion formed by a metal channel member with the outer side of its web exposed and an adjacent element having a straight edge portion formed by a metal channel member similarly exposed to engage the channel member of the other element, the two said channel members being formed on the outer sides of their webs with longitudinally extending complementary tongues and grooves disposed adjacent the flanges of the channel members with a tongue of one member engaging a groove of the other, one channel member being pivotally movable in one direction in relation to the other about an axis adjacent and parallel to one flange of the moving channel and movable similarly in the opposite direction about an axis adjacent and parallel to the other flange of the moving channel while maintaining, in the case of each movement, interlocking engagement between the tongue and groove adjacent the axis of the movement.

2. A structure as claimed in claim 1 in which each channel member is formed with a tongue adjacent one of its flanges and a groove adjacent its other flange.

3. A structure as claimed in claim 1 in which each channel member is formed with a tongue adjacent one of its flanges and a groove adjacent its other flange of a form and size that would fit over the said tongue and in which the two channel members are substantially identical in form.

4. A metal channel having its web formed on its outer side with a longitudinally extending tongue adjacent one of its flanges and a longitudinally extending groove adjacent its other flange, the tongue and groove being similar in form and size, whereby two sections of the channel can constitute complementary double tongue-and-groove interlocking members of a joint structure.

5. A joint structure comprising a pair of metal channel members disposed back to back with their flanges in substantial alignment and formed on the outer adjacent sides of their opposing webs with two pairs of complementary interlocking tongues and grooves extending lengthwise of the channels, one of the two pairs being disposed adjacent the aligning channel flanges on one side of the assembly and the other pair being disposed adjacent the other aligning flanges and one channel member being pivotally movable in one direction in relation to the other about an axis adjacent and parallel to one flange of the moving channel and movable similarly in the opposite direction about an axis adjacent and parallel to the other flange of the moving channel while maintaining, in the case of each movement, interlocking engagement between the tongue and groove adjacent the axis of the movement.

6. A joint structure as claimed in claim 5 in which each channel member is formed with a tongue adjacent one of its flanges and a groove adjacent its other flange.

7. A joint structure as claimed in claim 5 in which the tongues of the channel members are formed on one of said members and the grooves in the other of said members.

8. A joint structure comprising a pair of metal channel members disposed back to back with their flanges in substantial alignment, one of the channel members having the outer side of its web formed with a tongue extending lengthwise of the member and the other channel member being formed with a similarly extending groove to embrace the tongue, said groove having one of its sides approximately concavely cylindrical with respect to an axis disposed lengthwise of the members adjacent the juncture of the aligning flanges along one side of the joint, whereby a surface of the said tongue is maintained closely adjacent the said cylindrical surface of the groove when one of the two channel members is given pivotal movement relative to the other about the said axis.

9. A joint structure as claimed in claim 8 in which the tongue and the groove of the channel members are disposed close to the aligning channel flanges which are adjacent to the axis of the cylindrical side of the groove.

10. In a storm window of the two-panel type, the combination of an upper panel, means at the top of said panel for supporting it from a window frame structure with freedom to swing outward at its lower end, a lower panel disposed with its upper edge in engagement with the lower edge of the upper panel, said engaging panel edges being formed, respectively, with a tongue and a groove that fit together and permit pivotal movement of the lower panel relative to the plane of the upper panel, and resilient means for yieldingly supporting the lower panel from the upper panel while permitting the stated pivotal movement of the lower panel.

11. In a storm window of the multiple-panel type, the combination of an upper panel having a metal channel member forming the lower edge thereof with the outer side of the channel exposed, means at the top of the upper panel for supporting it from a window frame structure with freedom to swing outward at its lower end, a lower panel having a metal channel member forming the upper edge thereof with the outer side of the channel exposed to engage the channel member of the upper panel, the said channel members of the two panels being formed on the outer sides of their webs with longitudinally extending complementary tongues and grooves disposed adjacent the flanges of the channel members with a tongue of one member engaging a groove of the other, one panel being pivotally movable in one direction in relation to the plane of the other panel about an axis adjacent one channel flange of the moving panel and movable similarly in the opposite direction about an axis adjacent the other channel flange of the moving panel while maintaining, in the case of each movement, interlocking engagement between the tongue and groove adjacent the axis of the movement, and resilient means for supporting the lower panel from the upper panel and yieldingly pressing their two channel members together in interlocking engagement.

12. In a storm window of the multiple-panel type, the combination of an upper panel, means at the top of said panel for supporting it from a window frame structure with freedom to swing outward at its lower end, a lower panel disposed with its upper edge in engagement with the lower edge of the upper panel, means for pivotally connecting the two panels at their adjacent edges so that the lower panel can swing outward and inward in relation to the plane of the upper panel, locking means for securing the upper panel in either of several positions, including closed position, and locking means for securing the lower panel in either of several positions, including closed position.

13. In a storm window, the combination with a window frame structure, a window panel, means forming a relatively loose pivotal support for the panel in relation to the frame structure, and means for securing the panel in either of a plurality of adjusted positions comprising a spring-pressed bolt mounted for endwise and rotational movements in the window panel and a keeper for the bolt attached to the window frame structure, said bolt having an eccentric portion to engage the keeper and serving by the rotation of the bolt, after it has moved endwise into engagement with the keeper, to force the panel inward against the supporting frame structure.

14. In a window structure, the combination with a window frame structure, a window panel and means interposed between the frame and the upper edge of the panel to swingably support said panel, of locking means for the panel comprising an elongated metal keeper formed with a plurality of apertures and pivotally supported at one end in the window frame and swingable from an upright position when the window panel is closed to an approximately horizontal position when the window panel is open, and a movably mounted bolt carried by the window panel adjacent the pivoted keeper to cooperate with a selected one of the apertures thereof to secure the panel in either of several positions, including the closed position.

15. In a window structure, the combination of a window frame structure with jambs carrying screenstops, a window sash mounted in the said frame at the inner side of said stops, said sash having a transverse rail normally disposed intermediate the top and bottom of the frame structure opening, a window screen panel adapted to rest against the outer sides of the said stop with the top of the screen panel at approximately the height of the said transverse rail of the window sash, a sheet metal strip attached to the top of the screen panel and extending continuously from the screen panel to the said transverse rail from the upright window stop at one side of the frame opening to the window stop on the other side of said opening, and means for securing the screen panel in position in the frame.

16. A window structure as claimed in claim 15 in which the means for securing the screen panel in position comprise keepers secured to the inner side of the window frame in position to engage the upper part of the screen panel structure and a pair of coil springs each of which is attached at its upper end to the inner side of the window frame and at its lower end to a side bar of the panel frame, said springs drawing the screen panel upward against the said keepers and inward against the stops of the frame structure.

17. A window structure as claimed in claim 15 in which the screen panel has a wooden frame and the sheet metal strip is removably attached thereto to facilitate the substitution therefor of a modified metal member adapting the screen panel to be substituted for a corresponding glass panel of a storm window.

18. In a panel structure for building construction, the combination of a plurality of rectangular panels formed with wood frames and having attached to their opposite upright edges sheet metal channel members with their exteriors exposed and supporting means for said panels comprising upright posts each of which has a core of wood and a pair of sheet metal channel members attached to opposite sides of the core to cooperate with channel members of the panels, each pair of cooperating channel members of panel and post being formed on the outer sides of their webs with longitudinally extending complementaray tongues and grooves disposed adjacent the flanges of the channel members with a tongue of one member engaging a groove of the other and with the two sets of tongues and grooves forming a double interlocking joint between panel and post.

JOSEPH H. OSWALD.